United States Patent
Ikeda et al.

(10) Patent No.: US 6,696,150 B2
(45) Date of Patent: Feb. 24, 2004

(54) HEAT-SENSITIVE ADHESIVE MATERIAL

(75) Inventors: Toshiaki Ikeda, Shizuoka-ken (JP); Tomoyuki Kugo, Numazu (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 10/336,351

(22) Filed: Jan. 3, 2003

(65) Prior Publication Data
US 2003/0175507 A1 Sep. 18, 2003

(30) Foreign Application Priority Data

Jan. 11, 2002 (JP) ........................................ 2002-003992

(51) Int. Cl.⁷ ................................................ B32B 15/04
(52) U.S. Cl. ..................... 428/343; 428/346; 428/347; 428/353; 428/355 R; 428/913
(58) Field of Search ................................ 428/195, 212, 428/200, 206, 346, 347, 214, 913, 343, 353, 355 R

(56) References Cited

U.S. PATENT DOCUMENTS

| 2,725,364 A | 11/1955 | Dazzi | |
| 3,214,402 A | 10/1965 | Gobel | |
| 4,745,026 A | 5/1988 | Tsukahara et al. | 428/323 |
| 6,043,190 A | * 3/2000 | Ichikawa et al. | 503/200 |

FOREIGN PATENT DOCUMENTS

| EP | 0989162 | 3/2000 |
| EP | 1085069 | 3/2001 |
| EP | 1193284 | 4/2002 |
| GB | 793303 | 4/1958 |

OTHER PUBLICATIONS

Publication No. 20020064613 Sep. 25, 2001.*

* cited by examiner

Primary Examiner—Deborah Jones
Assistant Examiner—Abraham Bahta
(74) Attorney, Agent, or Firm—Cooper & Dunham LLP

(57) ABSTRACT

A heat-sensitive adhesive material having a substrate and a heat-sensitive adhesive layer which is provided on the substrate and which contains a thermoplastic resin and a solid plasticizer having a molecular weight of 250 to 550 and a melting point of 95 to 160° C.

12 Claims, No Drawings

HEAT-SENSITIVE ADHESIVE MATERIAL

BACKGROUND OF THE INVENTION

This invention relates to a heat-sensitive adhesive material which is non-adhesive at ambient temperature but becomes and remains adhesive upon and after being thermally activated.

Adhesive sheets and labels have been used for various applications such as for indication of price, bar codes, quality and amount of goods and for advertisement (stickers). An adhesive sheet or label generally is Composed of a substrate having one side provided with an information indicating layer and the other side on which an adhesive layer and a backing paper are laminated in this order. Information is recorded on the information indicating layer by various methods such as ink jet recording, heat-sensitive recording and pressure-sensitive recording. After recording, the backing paper is peeled away from the sheet or label and the exposed adhesive layer is bonded to a material to be bonded.

The above adhesive sheet has a problem in saving of resources because the backing paper is discarded without being recycled. Further, the adhesive sheet after the release of the backing paper poses a difficulty in handling because of the tackiness of the adhesive layer. Thus, the adhesive layer is apt to be adhered to an unwanted surface to cause curl, wrinkle or breakage thereof.

To cope with the above problems, there has been proposed a liner-free adhesive material (heat-sensitive adhesive material) which includes a substrate, an information indicating layer provided on one side of the substrate and a heat-sensitive adhesive layer provided on the other side of the substrate. The heat-sensitive adhesive layer is non-adhesive at ambient temperature but is capable of exhibiting adhesiveness when heated. The adhesive layer is composed of a thermoplastic resin, a plasticizer and, optionally, an additive such as a tackiness improver and is generally formed by applying a coating liquid containing these ingredients on the substrate.

The heat-sensitive adhesive layer does not at all show tackiness at room temperature. When thermally activated, however, the adhesive layer becomes adhesive. Such adhesiveness remains for a certain period of time even when the heat is removed therefrom. Although not yet fully clarified, the mechanism of the development of adhesiveness is considered to be such that, when the heat-sensitive adhesive material is heated, the plasticizer, when it is solid, is melted into an oily state and penetrates between the molecules of the thermoplastic resin. When a liquid plasticizer is, it is confined within microcapsules. In such a case, shells of the microcapsules are thermally destroyed, when the heat-sensitive adhesive material is heated, so that the plasticizer can plasticize the thermoplastic resin.

Because of freedom of the covering paper, the heat-sensitive adhesive material is advantageous from the standpoint of saving of resources and protection of environment. In addition, the adhesive material when bonded to an unwanted surface permits release from the surface by mere heating. Thus, the heat-sensitive adhesive material is now attractive in various fields.

Known heat-sensitive adhesive materials have a serious problem that the adhesiveness and the anti-blocking properties are still below a level required in the market. With regard to adhesiveness, the following problem exists. Hitherto, since polyvinyl chloride films have been used for wrapping foods, backing paper-bearing adhesive labels developed for POS (point of sales) system have been those suited for bonding to polyvinyl chloride films. Because of problems of dioxins, polyolefin films are now being substituted for polyvinyl chloride films. However, the existing backing paper-bearing adhesive labels have a problem that they fail to show sufficient adhesion strength to a polyolefin film. In particular, the adhesive layer is poor in bonding to and compatibility with a polyolefin resin film and is easily delaminated therefrom. While a lot of proposals have been made to overcome the problem, no satisfactory solution has been made. This also applies to liner-free adhesive material or heat-sensitive adhesive material.

Currently, there is a demand for a heat-sensitive adhesive material which exhibits satisfactory adhesiveness at low temperatures and which is suitably adhered to packages of raw meat, raw fish and other foods requiring storage in low temperature environment. In particular, such a heat-sensitive adhesive material is desired to be suitably adhered to cold bodies even when used in a cold environment. Moreover, for use in POS system, the heat-sensitive adhesive material is also desired to be suitably adhered to hot bodies. Thus, there is a demand for a heat-sensitive adhesive material which can exhibits high adhesion strength in a wide temperature range and yet can keep the adhesiveness for a long time. Known heat-sensitive adhesive materials are unsatisfactory in this respect.

With regard to anti-blocking property, the following problems exist. Blocking is a phenomenon of undesirable occurrence of tackiness when a heat-sensitive adhesive material is exposed to a temperature higher than room temperature for a long period of time. In general, a heat-sensitive adhesive material is an elongated sheet wound around a mandrel into a roll or cut stacked labels. Thus, when blocking occurs, the heat-sensitive adhesive layer adheres to its adjacent information indicating layer, so that the heat-sensitive adhesive material is no longer usable. When blocking occurs in a heat-sensitive adhesive material mounted on a recording device, the material cannot smoothly run through the device. When an image is recorded on-the information indicating layer, blocking may cause erasure of the recorded information.

A variety of proposals have been made for the purpose of preventing blocking problems. Published Examined Japanese Patent Application No. S62-21835 proposes addition of a wax having slipping property to a heat-sensitive adhesive layer. Published Unexamined Japanese Patent Application No. H02-282050 suggests incorporation of an inorganic material into a heat-sensitive adhesive layer. Published Unexamined Japanese Patent Applications No. H06-57223, No. H06-100847 and No. H06-10848 propose protecting surfaces of solid plasticizer with an inorganic compound or collide particles for the prevention of softening thereof.

The incorporation of a wax is, however, insufficient to prevent blocking. Rather, the adhesion strength of the heat-sensitive adhesive layer upon thermal activation is lowered. The addition of an inorganic material is also insufficient to prevent blocking. A solid plasticizer whose surface has been protected by an inorganic compound or colloid particles causes problems because melting and diffusing of the plasticizer are slow so that the adhesiveness is not quickly developed during thermal activation or the adhesion strength of the heat-activated adhesive layer is lowered. Blocking could be prevented when a plasticizer having a high melting point is used.

In this case, however, adhesion strength is considerably lowered. Thus, the conventional measures for improving anti-blocking properties are not satisfactory. Currently adopted is a method in which heat-sensitive adhesive materials are stored and transported while being maintained in a cold environment.

SUMMARY OF THE INVENTION

It is, therefore, an object of the present invention to provide a heat-sensitive adhesive material which, upon being thermally activated, can be suitably adhered not only to a low temperature surface but also to a high temperature surface and which can exhibit satisfactory adhesiveness not only in a low temperature environment but also in a high temperature environment.

Another object of the present invention is to provide a heat-sensitive adhesive material which has good anti-blocking property even when exposed to a relatively high temperature.

In accordance with the present invention there is provided a heat-sensitive adhesive material comprising a substrate and a heat-sensitive adhesive layer provided thereon and comprising a thermoplastic resin, and a solid plasticizer having a molecular weight of 250 to 550 and a melting-point of 95 to 160° C.

Hitherto, a solid plasticizer used in conjunction with a thermoplastic resin in a heat-sensitive adhesive layer of a heat-sensitive adhesive material has been a compound having a melting point lower than 95° C., so that, when the adhesive material is heated, the plasticizer is easily melted and becomes compatible with the thermoplastic resin to facilitate the development of the adhesiveness. The use of a compound having a melting point of at least 95° C. as the solid plasticizer has been avoided, because the compound being melted is easily solidified or becomes amorphous when the thermally activated adhesive layer is contacted with a cold surface to be bonded and/or when the thermally activated adhesive layer is exposed to a cold environment, thereby reducing the adhesiveness of the adhesive layer.

It has been found, however, that when a compound having a melting point lower than 95° C. is used as the solid plasticizer, a blocking problem is caused. Thus, when the heat-sensitive adhesive material in the form of a roll or stack is stored at 60° C., the solid plasticizer is apt to be melted, although in a small amount, so that the thermoplastic resin exhibits adhesiveness, thereby causing blocking.

It has been found that a heat-adhesive layer containing a solid plasticizer having a molecular weight of 250 to 550 and a melting point of 95 to 160° C. can exhibit suitable adhesiveness even in a low temperature environment and can adhere to a low temperature body.

Although not wishing to be bound by the theory, it is inferred that, when the heat-sensitive adhesive layer is thermally activated, a plasticizer compound having a molecular weight of 250 to 550 can easily enter between molecular chains of large molecules of the thermoplastic resin to change the properties of the thermoplastic resin and, hence, the solidification and/or amorphousizing of the thermoplastic resin are prevented or retarded when the adhesive layer is contacted with a cold surface or maintained in a low temperature environment. When the molecular weight is greater than 550, the plasticizer is not considered to be able to easily enter between the thermoplastic resin molecules. On the other hand, when the molecular weight is smaller than 250, the plasticizer compound has a high crystallinity and fails to exhibit plasticizing effect in a satisfactory manner. Even when the molecular weight of the plasticizer is in the range of 250 to 550, the desired plasticizing effect is not obtainable unless the melting point thereof is not higher than 160° C. When the melting point of the plasticizer exceeds 160° C., the plasticizer is not easily melted and cannot easily plasticize the thermoplastic resin. Further, the melted plasticizer easily solidifies when cooled.

DETAILED DESCRIPTION OF THE PREFERRED EMBODIMENTS OF THE INVENTION

A heat-sensitive adhesive material according to the present invention includes a substrate, and a heat-sensitive adhesive layer provided on one side of the substrate. The heat-sensitive adhesive layer is composed of a thermoplastic resin, a solid plasticizer and, optionally, one or more additives such as a tackifier.

The solid plasticizer includes, consists of or consists essentially of a compound having a molecular weight of 250 to 550 and a melting point of 95 to 160° C. It is preferred that the plasticizer compound have an asymmetrical molecular structure for reasons of improved plsticizing effect. Although not wishing to be bound by the theory, the asymmetrical molecule of the plasticizer has less stereo-regularity and is bulkier than symmetrical molecule having the same molecular weight. When entering between molecular chains of the thermoplastic resin, the asymmetrical molecule can more effectively reduce the intermolecular cohesive forces of the thermoplastic resin.

Stated otherwise, the plasticizer compound preferably has a symmetry number of 1. The term "symmetry number" of a molecule represents the number of indistinguishable positions into which the molecule can be turned by simple rigid rotations. For example, HCl has a symmetry number of 1, $CO_2$ has a symmetry number of 1 and $CH_4$ has a symmetry number of 12.

Specific examples of the plasticizer compound for use in the present invention are shown below together with the symmetry number ($\sigma$) and melting point (mp).

Compound 1

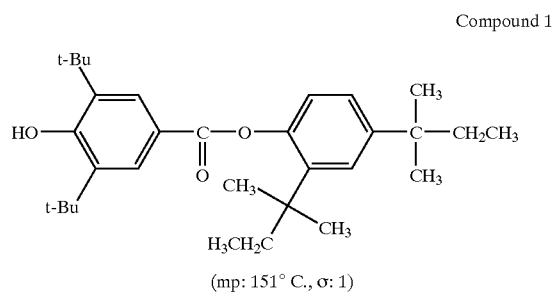

(mp: 151° C., $\sigma$: 1)

Compound 2

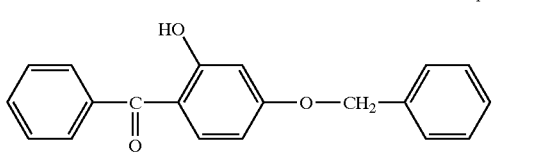

(mp: 115° C., $\sigma$: 1)

Compound 3

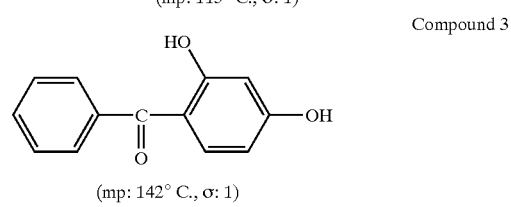

(mp: 142° C., $\sigma$: 1)

Compound 4
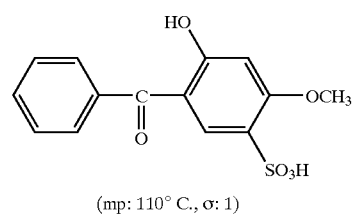
(mp: 110° C., σ: 1)
Compound 5
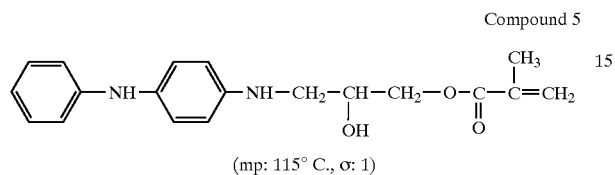
(mp: 115° C., σ: 1)
Compound 6
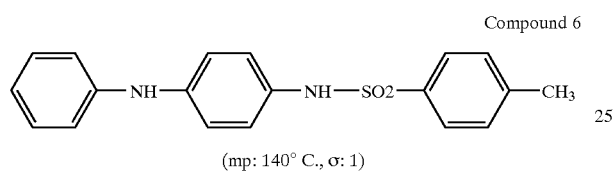
(mp: 140° C., σ: 1)
Compound 7
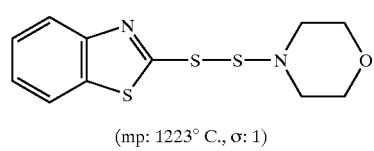
(mp: 1223° C., σ: 1)
Compound 8
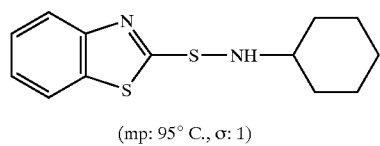
(mp: 95° C., σ: 1)
Compound 9
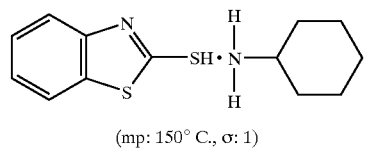
(mp: 150° C., σ: 1)
Compound 10
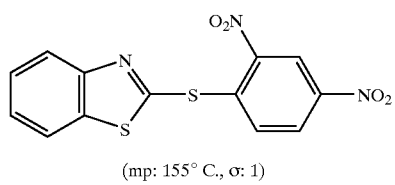
(mp: 155° C., σ: 1)
Compound 11
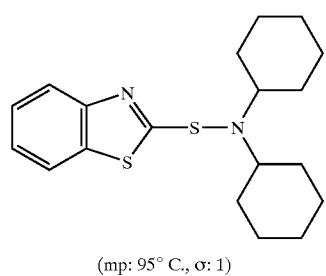
(mp: 95° C., σ: 1)
Compound 12
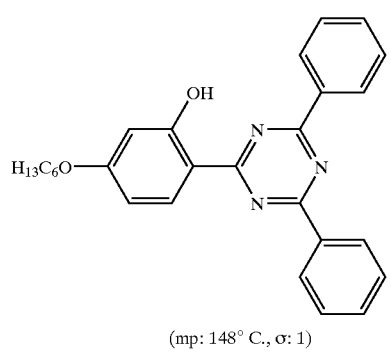
(mp: 148° C., σ: 1)
Compound 13
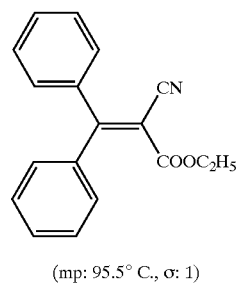
(mp: 95.5° C., σ: 1)
Compound 14
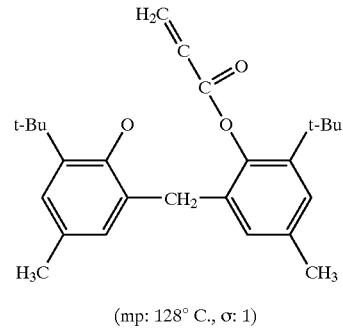
(mp: 128° C., σ: 1)
Compound 15
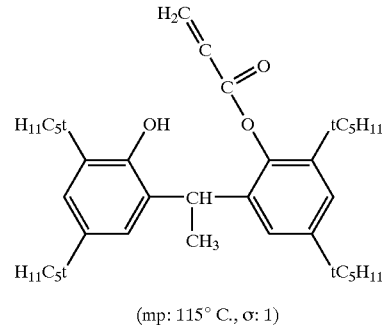
(mp: 115° C., σ: 1)
Compound 16
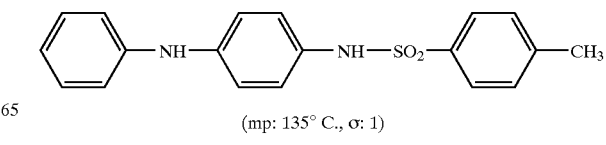
(mp: 135° C., σ: 1)

-continued
Compound 17
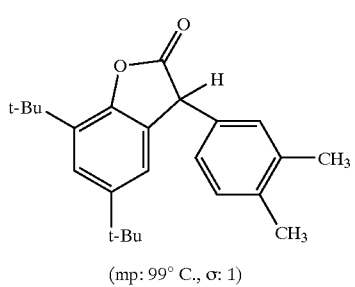
(mp: 99° C., σ: 1)
Compound 18
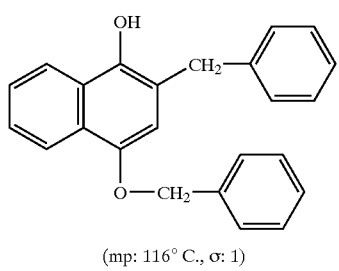
(mp: 116° C., σ: 1)
Compound 19
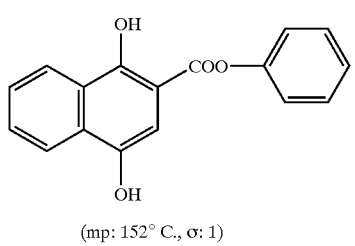
(mp: 152° C., σ: 1)
Compound 20
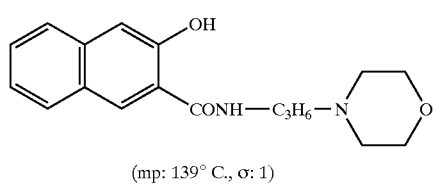
(mp: 139° C., σ: 1)
Compound 21
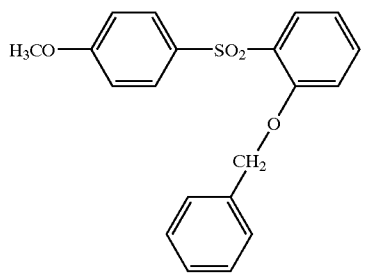
(mp: 139° C., σ: 1)
Compound 22
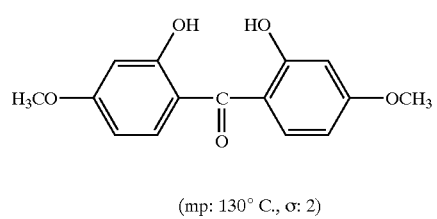
(mp: 130° C., σ: 2)
-continued
Compound 23
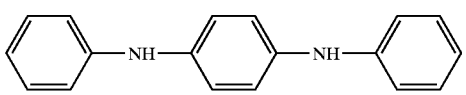
(mp: 144° C., σ: 2)
Compound 24
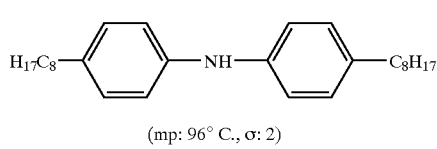
(mp: 96° C., σ: 2)
Compound 25
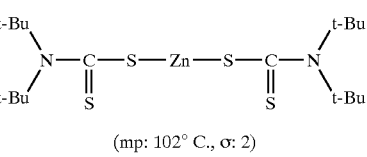
(mp: 102° C., σ: 2)
Compound 26
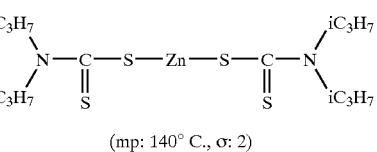
(mp: 140° C., σ: 2)
Compound 27
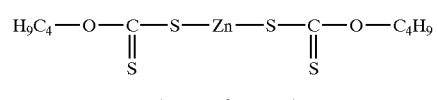
(mp: 105° C., σ: 2)
Compound 28
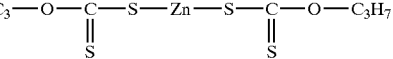
(mp: 145° C., σ: 2)
Compound 29
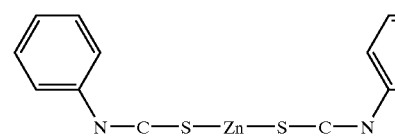
(mp: 103° C., σ: 2)
Compound 30
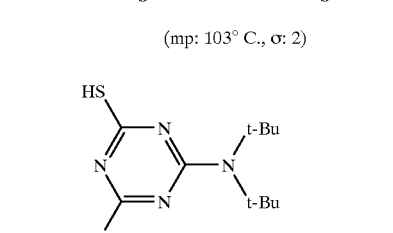
(mp: 137° C., σ: 2)
Compound 31
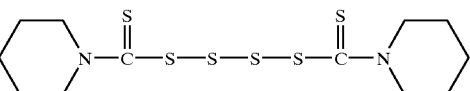
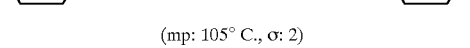
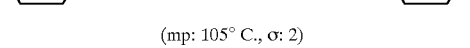
(mp: 105° C., σ: 2)

Compound 32

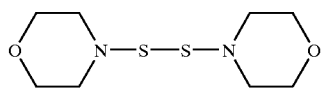

(mp: 120° C., σ: 2)

Compound 33

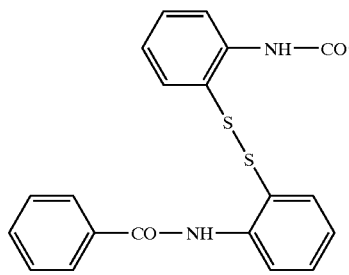

(mp: 136° C., σ: 2)

Compound 34

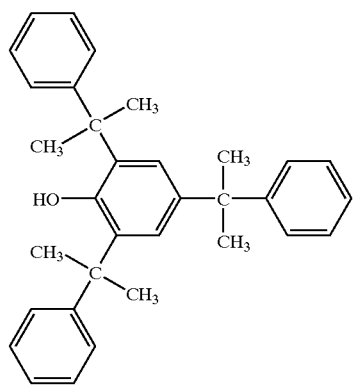

(mp: 143° C., σ: 2)

Compound 35

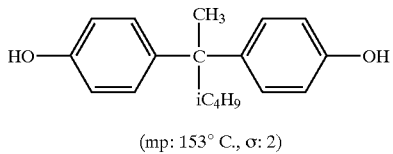

(mp: 153° C., σ: 2)

Compound 36

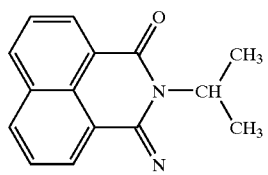

(mp: 154° C., σ: 2)

Compound 37

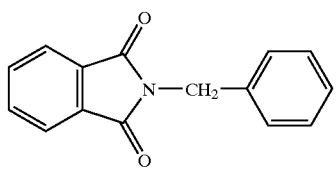

(mp: 111° C., σ: 2)

Compound 38

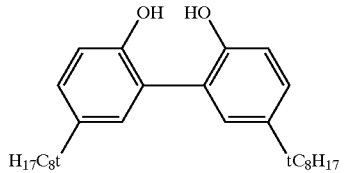

(mp: 133° C., σ: 2)

Compound 39

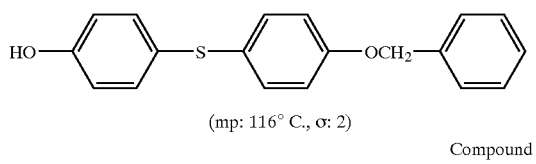

(mp: 116° C., σ: 2)

Compound 40

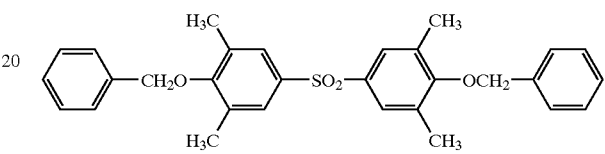

(mp: 117° C., σ: 2)

It is preferred that the solid plasticizer be at least one compound selected from compounds having a benzoate group (e.g. Compound 1 above), compounds having a benzophenone group (e.g. Compounds 2 to 4 above), compounds having a phenylenediamine group (e.g. Compounds 5 and 6 above) and compounds having a benzothiazole group (e.g. Compounds 7 to 11 above). Especially preferred is the use of Compounds 1, 2, 5 and 7 for reasons of high affinity with the thermoplastic resin and tackiness improver and improved adhesiveness of the heat-sensitive adhesive layer used in a low temperature environment.

The solid plasticizer is generally used in an amount of 1.5 to 4.0 parts by weight, preferably 2.5 to 3.5 parts by weight, per part by weight of the thermoplastic resin.

Any customarily employed thermoplastic resin may be suitably used in the heat-sensitive adhesive layer of the present invention. Examples of the thermoplastic resins include acrylate copolymers, methacrylate copolymers, styrene-isoprene copolymers, styrene-acrylate copolymers, styrene-butadiene copolymers, acrylonitrile-butadiene copolymers, ethylene-vinyl acetate copolymers, vinyl acetate-acrylate copolymers, ethylene-vinyl chloride copolymers, ethylene-acrylate copolymers, vinyl acetate-ethylene-vinyl chloride copolymers, vinyl acetate-ethylene-acrylate copolymers, vinyl acetate-ethylene-styrene copolymers, polybutadiene and polyurethane. Especially preferred is the use of an acrylate copolymer containing 2-ethylhexyl acrylate as comonomer thereof for reasons of good adhesiveness upon being heated.

It is preferred that a supercooling improving agent be contained in the heat-sensitive adhesive layer and/or a layer adjacent to the heat-sensitive adhesive layer for reasons of maintenance of the adhesiveness of the adhesive layer in a low temperature environment. The supercooling improving agent serves to lower the melting point of the solid plasticizer and to allow the solid plasticizer, melted by thermal activation of the heat-sensitive adhesive material, to be present as is, even when the melted plasticizer is exposed to a low temperature environment.

Any supercooling improving agent may be used for the purpose of the present invention as long as it can exhibit the above effect. It is preferred that the supercooling improving agent have a melting point of 60–180° C. for reasons of providing high adhesiveness at low temperatures. Examples of the supercooling improving agent include naphthol compounds such as 2-benzyloxynaphthalene; biphenyl compounds such as metaterphenyl, acetylbiphenyl, p-benzylbiphenyl and 4-allyloxybiphenyl; polyether compounds such as 1,2-bis(3-methylphenoxy)ethane, 2,2'-bis(4-methoxyphenoxy)diethyl ether and bis(4-methoxyphenyl) ether; carbonic acid diester such as diphenyl carbonate; and oxalic acid diesters such as dibenzyl oxalate, di(p-chlorobenzyl) oxalate and di(p-methylbenzyl) oxalate. Above all, the use of oxalic acid diesters or biphenyl compounds is preferred for reasons of both excellent supercooling improving property and anti-blocking property.

The supercooling improving agent is generally used in an amount of 0.2 to 2 parts by weight, preferably 0.5 to 1.5 parts by weight, per part by weight of the thermoplastic resin.

The supercooling improving agent is suitably an organic compound such as an aromatic oxy-substituted naphthalene, a biphenyl compound, a polyether compound, a carbonic acid diester or an oxalic acid diester. An oxalic acid diester or a biphenyl compound is preferably used.

The heat-sensitive adhesive layer may contain a tackifier for improving adhesiveness thereof while suppressing blocking properties. Examples of such tackifiers include terpene resins, aliphatic petroleum resins, aromatic petroleum resins, phenolic resins, terpene-phenol resins, styrene resins and coumarone-indene resins. The tackifier is generally used in an amount of 2 parts by weight or less, preferably 0.2–1.5 parts by weight, per part by weight of the thermoplastic resin.

The heat-sensitive adhesive layer may suitably contain an anti-blocking agent such as a wax or a filler, for reasons of improved anti-blocking properties. The wax may be, for example, an animal wax, a vegetable wax or a synthetic wax, or a heat-fusible substance such as a higher fatty acid, a higher fatty acid amide, a higher fatty acid anilide or an acetylated aromatic amine. Illustrative of suitable waxes are paraffin wax, carnauba wax, haze wax, montan wax, shellac, oxidized paraffin, polyethylene wax and oxidized polyethylene wax. Illustrative of suitable higher fatty acids are stearic acid and behenic acid. Illustrative of suitable higher fatty acid amides are stearamide, oleamide, N-methyistearamide, erucamide, N-methylol behenamide, N-methylol stearamide, methylenebis(stearamide) and ethylenebis(stearamide). Illustrative of suitable higher fatty acid anilides are stearanilide and linolanilide. Acetotoluide is an example of acetylated aromatic amine. Other heat-fusible substances such as leuco dyes and developers used in thermosensitive recording materials may also be used as an anti-blocking agent. The above wax and other heat-fusible substances preferably have a high melting point for reasons of freedom of adversely affecting the adhesiveness of the heat-sensitive adhesive layer.

Illustrative of suitable fillers for use as the anti-blocking agent are inorganic fillers such as carbonates, oxides, hydroxides and sulfates of metals (e.g. aluminum, zinc, calcium, magnesium, barium and titanium), and clay minerals (e.g. silica, zeolite, kaolin and calcined kaolin); and organic fillers such as starch, styrene resins, polyolefin resins, melamine resins, acrylic resins, paraffins, natural wax and synthetic wax. The filler is generally used in an amount of 1.5 parts by weight or less, preferably 0.6 to 1 part by weight, per part by weight of the thermoplastic resin.

The heat-sensitive adhesive layer may further contain a water-soluble high molecular weight binder for the purpose of improving bonding strength between the adhesive layer and the substrate. Illustrative of suitable water-soluble binders are polyvinylalcohol, polyvinyl acetate, oxidized starch, etherized starch, cellulose derivatives (e.g. carboxymethyl cellulose and hydroxyethyl cellulose), casein, gelatin and sodium alginate. The water-soluble binder is generally used in an amount of 30% or less, preferably 10% by weight or less, based on the total weight of solid matters constituting the heat-sensitive adhesive layer.

The heat-sensitive adhesive layer may further contain various other additives such as film a hardening agent, an antiseptic agent, a coloring agent, a UV absorber, an anti-oxidation agent, a pH controlling agent and an anti-foaming agent.

For the purpose of efficiently utilizing the thermal energy applied to the heat-sensitive adhesive layer for creating adhesiveness therein while minimizing transfer of the heat to the substrate, a heat insulating layer may be suitably interposed between the substrate and the adhesive layer. The insulating layer may be constructed by incorporating therein hollow or void particles made of a resin such as an acrylic polymer or a polyvinylidene chloride. The void particles may be those formed previously or those formed in situ during the formation of the insulating layer, but the former is preferable. The insulating layer may be formed by, for example, applying a coating liquid in the form of a dispersion containing a binder and void particles to the substrate, the coated layer being then dried.

As described hereinafter, the heat-sensitive adhesive material of the present invention preferably has a heat-sensitive recording layer provided on opposite side of the substrate from the heat-sensitive adhesive layer. In such a case, it is not desirable that the heat energy applied to the heat-sensitive adhesive layer be transmitted to the heat-sensitive recording layer, thereby causing undesirable coloring of the recording layer. The insulating layer can serve to avoid such undesirable coloring of the recording layer during the heating of the heat-sensitive adhesive layer.

As the binder for the non-expanded insulating layer, a water-soluble polymer or an aqueous polymer emulsion is preferably used. Illustrative of suitable water-soluble polymers are polyvinyl alcohol, starch and starch derivatives, cellulose derivatives such as methoxy cellulose, hydroxyethyl cellulose, carboxymethyl cellulose, methyl cellulose and ethyl cellulose, sodium polyacrylate, polyvinyl pyrrolidone, acrylamide-acrylic ester copolymer, acrylamide-acrylic ester-methacrylic acid terpolymer, alkali salts of styrene-maleic anhydride copolymer, polyacrylamide, sodium alginate, gelatin and casein. Illustrative of suitable aqueous polymer emulsions are latexes such as styrene-butadiene copolymer and styrene-butadiene-acrylic copolymer and emulsions such as vinyl acetate resin, vinyl acetate-acrylic acid copolymer, styrene-acrylate copolymer, acrylate resin and polyurethane resin.

The substrate for supporting the heat-sensitive adhesive layer thereon may be any conventionally employed substrate such as paper, synthetic paper, non-woven fabric or a plastic film. Any paper conventionally employed in the field of heat-sensitive adhesive material may be used for the purpose of the present invention. The paper sheets usable for the substrate are pulp sheets comprising, as a principal component, a wood pulp. The wood pulp is selected from, for example, chemical pulps, for example, LBKP and NBKP, mechanical pulps, for example, GP, PGW, RMP, TMP, CTMP, CMP and CGP, and used paper pulps, for example, DIP. The pulp is optionally added with conventional additives for paper-forming. The additives for paper-forming include, for example, various types of pigments, binders, sizing agents, fixing agents, yield-enhancing agents, cationizing agents, dry paper strength-enhancing agents, wet paper strength-enhancing agents, pH-regulating agent, electroconductive agents, and dyes. These additives may be used alone or in a mixture of two or more thereof. The paper machine may be selected from conventional wire paper machines, cylinder paper-forming machines, twine, wire paper-forming machines. The paper-forming method may be an acid, neutral or alkaline paper-forming method. The resultant paper sheet may be surface-smoothed by calendaring. The calendaring may be machine calendar, super calendar, soft calendar, gloss calendar or matte calendar. The control of the smoothness may be either off-machine or on-machine.

Examples of the pigment preferably comprises at least one member selected from inorganic pigments, for example, precipitated calcium carbonate, ground calcium carbonate, kaolin, clay, talc, calcium sulfate, barium sulfate, titanium dioxide, zinc oxide, zinc sulfide, satin white, aluminum silicate, alumina diatomaceous earth, calcium silicate, magnesium silicate, synthetic amorphous silica, colloidal silica, magnesium hydroxide, alumina, synthetic zeolite, magnesium carbonate, aluminum hydroxide, lithopone and zinc cabonate; and organic pigments, for example, styrene plastic polymer pigments, acrylic plastic resin pigments, polyethylene, microcupsules, a urea resin and a melamine resin.

Examples of substrates other than paper include films or sheets made of a resin, such as polyethylene, polypropylene, polyethylene terephthalate or polyamide; synthetic papers or non-woven fabrics made of the above resin, laminate sheets having a resin film provided on one or both sides of paper or another resin film; metal foils; laminates of paper and metal foils; metal vacuum deposited paper; hologram-treated opaque sheets; mica paper; and glass paper. The thickness of the substrate is not specifically limited and is generally 40–300 $\mu$m, preferably 60–150 $\mu$m.

The heat-sensitive adhesive material of the present invention may be prepared by applying a coating liquid containing the above ingredients for the heat-sensitive adhesive layer on one side of the substrate. The applied coating is subsequently dried to form the heat-sensitive adhesive layer on the substrate. The coating liquid may be an organic solvent solution or an aqueous emulsion or dispersion (which may contain an organic solvent). Preferably, the coating liquid may be prepared by mixing an aqueous emulsion or dispersion, (which may contain an organic solvent) containing the thermoplastic resin with a wet dispersion containing the solid plasticizer. The supercooling improving agent may be also mixed in the form of a wet dispersion. The tackifier may be also mixed in the form of an aqueous emulsion.

When the heat-sensitive adhesive material has a heat-sensitive recording layer, a coating liquid for the recording layer is first applied onto one side of the substrate and dried. An optional protective layer is then coated on the recording layer, followed by calendaring. The coating liquid for the heat-sensitive adhesive layer is subsequently applied on the other side of the substrate.

The thermoplastic resin particles dispersed in the aqueous emulsion preferably have an average particle diameter of 0.1–1.0 $\mu$m, preferably 0.15–0.65 $\mu$m and have such a particle size distribution that at least 90% by weight thereof have a particle diameter of 1.5 $\mu$m or less, preferably 1.35 $\mu$m or less. The plasticizer particles generally have an average particle diameter of 0.5–15 $\mu$m, preferably 0.8–5 $\mu$m. The average particle diameter and the particle distribution herein are as measured with particle distribution measuring device LA-700 manufactured by Horiba Manufacturing Co., Ltd.

The coating of the coating liquid on the substrate may be carried out by any suitable conventional method using, for example, a blade coater, a gravure coater, a gravure offset coater, a bar coater, a roll coater, a knife coater, an air knife coater, a comma coater, a U comma coater, an AKKU coater, a smoothing coater, a micro-gravure coater, a reverse roll coater, a 4- or 5-roll coater, a dip coater, a drop curtain coater, a slide coater or a die coater.

The drying of the coated liquid on the substrate must be carried out at a temperature which does not cause the plasticizer to melt. Hot air, IR irradiation, microwave or high frequency may be utilized for the drying.

The opposite side of the substrate from the heat-sensitive adhesive layer may be printed by any suitable conventional technique. An information indication layer may be provided on opposite side of the substrate from the heat-sensitive adhesive layer. As the information indication layer, a heat-sensitive recording layer may be suitably used since the activation of the adhesive layer and the formation of images may be performed, either successively or simultaneously, by application of heat. The information indication layer may have printing thereon. The print is preferably by using a UV-curable ink so that anti-blocking property is imparted to the printed surface.

The heat-sensitive adhesive material having a recording layer may be completely cut into individual labels. Alternatively, the heat-sensitive adhesive material having a recording layer may be in the form of a roll which is cut transverse to the length direction of the elongation of the roll, with less than complete severing, into labels such that respective labels are detachable from each other. The cutting may be by fine perforations or die cuts.

The heat-sensitive recording layer contains a binder, a leuco dye and a developer. When the heat-sensitive recording layer is heated with, for example, a thermal head, the leuco dye colors by the action of the developer. Any suitable known leuco dyes and developers used in the conventional thermosensitive recording materials may be used for the purpose of the present invention.

The leuco dyes may be, for example, fluoran-type leuco compounds, triarylmethane-type leuco compounds, spiro-type leuco compounds, diphenylmethane-type leuco compounds, thiazine-type leuco compounds, lactom-type leuco compounds, and fluoren-type leuco compounds. Such leuco dyes preferably show an absorption spectrum in which at least one maximum absorption peak is present at a wavelength in the range of 550–1000 nm ($\lambda$max).

Specific examples of leuco dyes are as follows:
Fluoran dyes:
3-diethylamino-6-methyl-7-anilinofluoran,
3-dibutylamino-6-methyl-7-anilinofluoran,
3-(N-methyl-N-cyclohexylamino)-6-methyl-7-anilinofluoran,
3-(N-ethyl-N-cyclopentylamino)-6-methyl-7-anilinofluoran,
3-(N-isobutyl-N-ethylamino)-6-methyl-7-anilinofluoran,
3-[(N-ethyl-N-(3-ethoxypropyl)amino]-6-methyl-7-anilinofluoran, 3-(N-ethyl-N-hexylamino)-6-methyl-7-anilinfluoran,
3-dipentylamino-6-methyl-7-anilinofluoran,
3-(N-methyl-N-propylamino)-6-methyl-7-anilinofluoran,
3-(N-ethyl-N-tetrahydrofurylamino)-6-methyl-7-anilinofluoran,
3-diethylamino-6-methyl-7-(p-chloroanilino)fluoran,
3-diethylamino-6-methyl-7-(p-fluoroanilino)fluoran,
3-(p-toluidinoethylamino)-6-methyl-7-anilinofluoran,
3-diethylamino-6-methyl-7-(p-toluidino)fluoran,
3-diethylamino-7-(3,4-dichloroanilino)fluoran,
3-pyrrolidino-6-methyl-7-anilinofluoran,
3-diethylamino-6-chloro-7-ethoxyethylaminofluoran,
3-diethylamino-6-chloro-7-anilinofluoran,
3-diethylamino-7-phenethylfluoran,
3-(p-toluidinoethylamino)-6-methyl-7-phenethylfluoran;
triallylmethane dyes:
3,3-bis(p-dimethylaminophenyl)-6-dimethylaminophthalide (crystal violet lactone),
3,3-bis(p-dimethylaminophenyl)phthalide,
3-(p-dimethylaminophenyl)-3-(1,2-dimethylindole-3-yl)phthalide,
3-(p-dimethylamino-phenyl)-3-(2-methylindole-3-yl)phthalide,
3,3-bis(1,2-dimethylindole-3-yl)-5-dimethylaminophthalide,
3,3-bis(1,2-dimethylindole-3-yl)-6-dimethylaminophthalide,
3,3-bis(9-ethylcarbazole-3-yl)-6-dimethylaminophthalide,
3,3-bis(2-phenylindole-3-yl)-6-dimethylaminophthalide,
3-p-dimethylaminophenyl-3-(1-methylpyrrol-3-yl)-6-dimethylaminophthalide;
Spiro dyes:
3-methyl-spiro-dinaphthopyrane,
3-ethyl-spiro-dinaphthopyrane,
3-phenyl-spiro-dinaphthopyrane,
3-benzyl-spiro-dinaphthopyrane,
3-methyl-naphtho-(6'-methoxybenzo)-spiro-pyrane,
3-propyl-spiro-dibenzopyrane,
3,3'dichloro-spiro-dinaphthopyrane,
1,3,3-trimethyl-6-nitro-8'-methoxy-spiro-(indoline-2,2'-benzopyrane);
Diphenylmethane:
N-halophenyl-leucoauramine,
4,4'-bis-dimethylaminobenzhydrylbenzyl ether,
N-2,4,5-trichlorophenyl-leucoauramine;
Thiazine dyes:
benzoylleucomethylene blue,
p-nitrobenzoylmethylene blue;
Lactam dyes:
rhodamine B-anilinolactam,
rhodamine B-p-chloroanilinolactam;
Fluorene dyes:
3,6-bis(dimethylamino)fluorene-spiro-(9,3')-6'-dimethylaminophthalide,
3,6-bis(dimethylamino)fluorene-spiro-(9,3')-6'-pyrrolidinophthalide,
3-dimethylamino-6-diethylaminofluorene-spiro-(9,3')-6'-pyrrolidinophthalide;
Color basic leuco dyes:
3-diethylamino-6-methyl-7-chlorofluoran,
3-cyclohexylamino-6-chlorofluoran,
3-diethylaminobenzo[α]fluoran,
3-dibutylaminobenzo[α]fluoran,
3-diethylamino-7-chlorofluoran,
3-diethylamino-7-methylfluoran,
3-N-ethyl-N-isoamylaminobenzo[α]fluoran,
3-N-ethyl-N-p-methylphenylamino-7-methylfluoran,
3-diethylamino-6,8-dimethylfluoran,
3-dibutylamino-6-methyl-7-bromofluoran,
3,6-bis(diethylaminofluoran)-γ-(4'-nitro)anilinolactam,
bis(1-n-butyl-2-methylindol-3-yl)phthalide,
bis(1-ethyl-2-methylindol-3-yl)phthalide,
3-(4-diethylamino-2-ethoxyphenyl)-3-(1-ethyl-2-methylindol-3-yl)-4-azaphthalide,
3-(4-diethylaminophenyl)-3-(1-ethyl-2-methylindol-3-yl)phthalide,
3-(4-diethylamino-2-methylphenyl)-3-(1-ethyl-2-methylindol-3-yl)phthalide,
3,3-bis(4-dimethylaminophenyl)-6-diethylaminopthalide,
3,7-bis(4-dimethylamino)-10-benzorylphenothiazine,
3,3-bis(4-diethylamino-6-ethoxyphenyl)-4-azapthalide,
3-diethylamino-7-dianilinofluoran,
3-N-ethyl-N-4-methylphenylamino-7-N-methylanilinofluoran,
3-diethylamino-7-dibenzylaminofluoran,
3,6-dimethoxyfluoran,
2',4'-dioctoxyphenyl-2-citrylquinoline.

Leuco dyes may be used singly or in combination of two or more.

Any conventional developer used in the field of pressure-sensitive or heat-sensitive recording media may be used for inducing color formation of the above-mentioned leuco dyes. Such developers include, for example, phenol compounds, thiophenol compounds, thiourea compounds, organic acids and metal salts of organic acids. Specific examples of such color developers include:
bis(3-allyl-4-hydroxyphenyl)sulfone,
α-naphthol,
β-naphthol,
p-octylphenol,
4-t-octylphenol,
p-t-butylphenol,
p-phenylphenol,
1,1-bis(p-hydroxyphenyl)propane,
2,2-bis(p-hydroxyphenyl)propane (bisphenol A),
2,2-bis(p-hydroxyphenyl)butane,
1,1-bis(p-hydroxyphenyl)cyclohexane,
4,4'-thiobisphenol,
4,4'-cyclohexylidenediphenol,
2,2-(2,5-dibromo-4-hydroxyphenyl)propane,
4,4'-isopropylidenebis(2-t-butylphenol),
2,2'-methylenebis(4-chlorophenol),
4,4'-diphenolsulfone,
4-hydroxy-4'-ethoxydiphenylsulfone,
4-hydroxy-4'-isopropoxydiphenylsulfone,
4-hydroxy-4'-butoxydiphenylsulfone,
bis(4-hydroxyphenyl)methyl acetate,
bis(4-hydroxyphenyl)benzyl acetate,
bis(4-hydroxyphenyl)butyl acetate,
2,4-dihydroxy2'-methoxybenzanilide,
ethyl p-hydroxybenzoate,
benzyl p-hydroxybenzoate,
dibenzyl 4-hydroxyphthalate,
dimethyl 4-hydroxyphthalate,
ethyl 5-hydroxyisphthalate,
3,5-di-t-butylsalicylic acid,
3,5-di-α-methylbenzylsalicylic acid.

The above developers may be employed alone or in combination.

The heat-sensitive recording layer further contains a binder resin. Any conventionally employed binder such as a water-soluble natural or synthetic polymer may be suitably used for the purpose of the present invention. Examples of natural water-soluble polymers include cellulose derivatives such as methoxy cellulose, hydroxyethyl cellulose, carboxymethyl cellulose, methyl cellulose and ethyl cellulose, and sucrose such as starch, oxidized starch and esterified starch. Examples of water-soluble synthetic pollymers include polyvinyl alcohol, modified polyvinyl alcohol, polyvinyl pyrrolidone, polyacrylic acid, polysodium acrylate, acrylamide-acrylic ester copolymer, acrylamide-acrylic ester-methacrylic acid terpolymer, alkali salts of styrene-maleic anhydride copolymer, polyacrylamide, styrene-maleic anhydride. An aqueous polymer emulsion of polyvinyl acetate, polyurethane, polyacrylate, polymethacrylate, polybutylmethacrylate, vinyl chloride-vinyl acetate copolymer or ethylene-vinyl acetate copolymer, or a latex of styrene-butadiene copolymer and styrene-butadiene-acrylic copolymer may also be used as the binder.

The heat-sensitive recording layer may contain a heat-fusible material for improving heat sensitivity. Illustrative of suitable heat-fusible material are oxalate compounds such as dibenzyl oxalate and di-p-chlorobenzyl oxalate; fatty amides such as stearamide, palmitamide and N-hydroxymethylstearaminde; naphthol compounds such as 2-benzyloxynaphthalene; biphenyl compounds such as p-(2-vinyloxyethoxy)biphenyl, acetyl biphenyl, p-allyloxybiphenyl, p-propagyloxybiphenyl and p-benzylbiphenyl; polyethers such as 1,2-bis(3-methylphenoxy)ethane, 2,2'-bis(4-methoxyphenoxy)diethyl ether and bis(4-methoxyphenyl), ether; carbonates such as diphenyl carbonates.

The heat-sensitive recording layer may additionally contains various conventionally employed additives such as a surfactant, an organic or inorganic filler and a lubricant. Examples of fillers include silica, zinc oxide, aluminum hydroxide, magnesium carbonate, titanium oxide, kaolin, calcined kaolin, clay, talc, calcium carbonate and urea-formaldehyde resin.

In addition to the heat-sensitive recording layer, one or more additional layers may be provided above and/or below the recording layer. For example, an intermediate layer, such as a heat insulating layer, may be interposed between the substrate and the heat-sensitive recording layer. The heat insulating layer is similar to that described previously and serves to improve heating efficiency for the heat-sensitive recording layer during recording. A protective layer may also be provided over the surface of the heat-sensitive recording layer to prevent fouling and to improve water-resistance. A print may be applied onto the heat-sensitive recording layer or the protective layer to provide additional information.

It is desirable that the heat-sensitive recording layer, the heat-insulating layer, the protective layer and the print layer be composed so that they do not adversely affect the function of the heat-sensitive adhesive layer. For example, when the print layer is provided, the ink therefor is desirably a UV-curable ink that is non-adhesive to the heat-sensitive adhesive layer.

The heat-sensitive recording layer, the heat-insulating layer and the protective layer may be formed by any conventionally employed method such as a blade coating, a gravure coating or any other coating method described previously with regard to the formation of the heat-sensitive adhesive layer.

The heat-sensitive adhesive material may be thermally activated by any suitable means such as a heater plate, hot air, IR rays, a heated roll or a thermal head. The use of a thermal head is advantageous because heat generation can be controlled on demand, because thermal activation occurs simultaneously with electrical energization, and because heat may be efficiently and quickly transferred to the heat-sensitive adhesive layer. In particular, the use of a thermal head having a heating section at a near edge, a corner edge or an end surface thereof is advantageous, because ingredients constituting the heat-sensitive adhesive layer are prevented from sticking to the thermal head.

After being thermally activated, the heat-sensitive adhesive material is bonded to an article to be bonded. The article to be bonded is not specifically limited and can be any material, such as paper, resin and wood, having any thickness. The heat-sensitive adhesive material may be suitably used in POS system. Thus, the article to be bonded may be a resin film for packaging food. Even when the article to be bonded is a polyolefin film or sheet to which the conventional labels (inclusive of liner-free labels) are not usable under low temperature conditions, the heat-sensitive adhesive material of the present invention can show satisfactory adhesiveness.

The following examples will further illustrate the present invention. Parts and percentages are by weight.

EXAMPLE 1

Preparation of Liquid Dispersion [A] Containing Solid Plasticizer

10 Parts of a solid plasticizer (above Compound 33; molecular weight: 456.59; melting point: 136° C.; symmetry number: 2) were mixed with 300 parts of a dispersing medium composed of 10 parts of a 10% aqueous solution of polyvinyl alcohol and 20 parts of water and the mixture was pulverized with a ball mill to obtain a liquid dispersion [A] containing particles of the solid plasticizer having an average particle diameter of 1.0 $\mu$m.

Preparation of Coating Liquid [C] for Heat-Sensitive Adhesive Layer

400 Parts of the above liquid dispersion [A] was mixed with 100 parts of an emulsion (solid content: 50%) containing 2-ethylhexyl acrylate (thermoplastic resin) and 50 parts of a dispersion containing 50% of terpene-phenol resin (tackifier) to obtain a coating liquid [C] for heat-sensitive adhesive layer.

Preparation of Heat-sensitive Adhesive Material

The above coating liquid [C] was applied on one side of a paper substrate using a wire bar in an amount of 3.0 g/m$^2$ (on dry basis) and the coating was dried and then placed in a chamber at 29° C. under a relative humidity of 35% for 24 hours to form a heat-sensitive adhesive layer on the substrate, thereby obtaining a heat-sensitive adhesive material according to the present invention.

EXAMPLE 2

Example 1 was repeated in the same manner as described except that above Compound 13 (molecular weight: 277; melting point: 95.5° C.; symmetry number: 1) was substituted for Compound 33, thereby obtaining a heat-sensitive adhesive material according to the present invention.

EXAMPLE 3

Example 1 was repeated in the same manner as described except that above Compound 1 (molecular weight: 442; melting point: 151° C.; symmetry number: 1) was substituted for Compound 33, thereby obtaining a heat-sensitive adhesive material according to the present invention.

EXAMPLE 4

Example 1 was repeated in the same manner as described except that above Compound 2 (molecular weight: 303;

melting point: 115° C.; symmetry number: 1) was substituted for Compound 33, thereby obtaining a heat-sensitive adhesive material according to the present invention.

EXAMPLE 5

Example 1 was repeated in the same manner as described except that above Compound 6 (molecular weight: 338; melting point: 140° C.; symmetry number: 1) was substituted for Compound 33, thereby obtaining a heat-sensitive adhesive material according to the present invention.

EXAMPLE 6

Example 1 was repeated in the same manner as described except that above Compound 7 (molecular weight: 284; melting point: 123° C.; symmetry number: 1) was substituted for Compound 33, thereby obtaining a heat-sensitive adhesive material according to the present invention.

EXAMPLE 7

Preparation of Liquid Dispersion [B] Containing Supercooling Improving Agent

10 Parts of 4-acetylbiphenyl (supercooling improving agent) were mixed with 10 parts of a 10% aqueous solution of polyvinyl alcohol and 20 parts of water and the mixture was pulverized with a ball mill to obtain a liquid dispersion [B] containing particles of the supercooling improving agent having an average particle diameter of 1.0 μm.

Preparation of Coating Liquid [D] for Heat-sensitive Adhesive Layer

400 Parts of the liquid dispersion used in Example 2 and containing Compound 13 as the solid plasticizer was mixed with 100 parts of an emulsion (solid content: 50%) containing 2-ethylhexyl acrylate copolymer (thermoplastic resin), 50 parts of a dispersion containing 50% of terpene-phenol resin (tackifier) and 260 parts of the above liquid dispersion [B] to obtain a coating liquid [D] for heat-sensitive adhesive layer.

Preparation of Heat-sensitive Adhesive Material

The above coating liquid [D] was applied on one side of a paper substrate using a wire bar in an amount of 3.0 g/m² (on dry basis) and the coating was dried and then placed in a chamber at 29° C. under a relative humidity of 35% for 24 hours to form a heat-sensitive adhesive layer on the substrate, thereby obtaining a heat-sensitive adhesive material according to the present invention.

EXAMPLE 8

Example 7 was repeated in the same manner as described except that above Compound 7 (molecular weight: 284; melting point: 123° C.; symmetry number: 1) was substituted for Compound 13, thereby obtaining a heat-sensitive adhesive material according to the present invention.

EXAMPLE 9

Preparation of Coating Liquid [E] for Heat Insulating Layer 4.0 Parts of an emulsion (solid matter content: 25%) containing void particles (voidage: 50%), 0.4 part of a styrene latex (solid matter content: 50%), 1.0 part of a 10% aqueous polyvinyl alcohol and 1.1 parts of water were mixed well to form a coating liquid [N] for a heat insulating layer.

The above coating liquid [E] was applied on one side of a paper substrate using a wire bar in an amount of 3.0 g/m² (on dry basis) and the coating was dried to form a heat insulating layer on the substrate. Then the above coating liquid [D] was applied on the heat insulating layer in the same manner as that in Example 7, thereby obtaining a heat-sensitive adhesive material according to the present invention.

EXAMPLE 10

The above coating liquid [E] was applied on one side of a paper substrate using a wire bar in an amount of 3.0 g/m² (on dry basis) and the coating was dried to form a heat insulating layer on the substrate. Then the coating liquid for forming a heat-sensitive adhesive layer used in Example 8 was applied on the heat insulating layer in the same manner as that in Example 8, thereby obtaining a heat-sensitive adhesive material according to the present invention.

EXAMPLE 11

On the opposite side, from the heat-sensitive adhesive layer, of the heat-sensitive adhesive material obtained in Example 10, an image was printed using a UV-curable ink, thereby obtaining a heat-sensitive adhesive material according to the present invention.

Comparative Example 1

Preparation of Liquid Dispersion [F] Containing Solid Plasticizer

10 Parts of a solid plasticizer (Compound 41; molecular weight: 586.8; melting point: 79° C.; symmetry number: 2) having a chemical structure shown below were mixed with 30 parts of a dispersing medium composed of 10 parts of a 10% aqueous solution of polyvinyl alcohol and 20 parts of water and the mixture was pulverized with a ball mill to obtain a liquid dispersion [F] containing particles of the solid plasticizer having an average particle diameter of 1.0 μm.

Preparation of Coating Liquid [G] for Heat-sensitive Adhesive Layer

84 Parts of the above liquid dispersion [F] was mixed with 10 parts of an emulsion (solid content: 50%) containing a copolymer of 2-ethylhexyl acrylate and butyl acrylate (thermoplastic resin; weight ratio of 2-ethylhexyl acrylate to butyl acrylate: 8:2), and 6 parts of a dispersion containing 50% of terpene-phenol resin (tackifier) to obtain a coating liquid [G] for heat-sensitive adhesive layer.

Preparation of Heat-sensitive Adhesive Material

The above coating liquid [G] was applied on one side of a paper substrate using a wire bar in an amount of 3.0 g/m2 (on dry basis) and dried to form a heat-sensitive adhesive layer on the substrate, thereby obtaining a comparative heat-sensitive adhesive material.

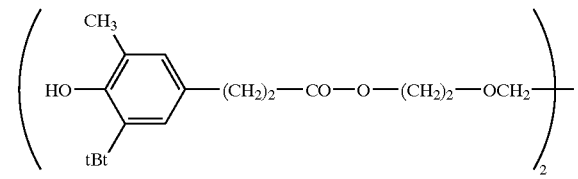

Compound 41

Comparative Example 2

Comparative Example 1 was repeated in the same manner as described except that above Compound 42 (molecular weight: 132.23; melting point: 70° C.; symmetry number: 2) was substituted for Compound 41, thereby obtaining a comparative heat-sensitive adhesive material.

Compound 42

H₅C₂—NH\
            C=S\
H₅C₂—NH

Comparative Example 3

Comparative Example 1 was repeated in the same manner as described except that above Compound 43 (molecular weight: 634; melting point: 195° C.; symmetry number: 2) was substituted for Compound 41, thereby obtaining a comparative heat-sensitive adhesive material Compound 43

[Structure: bis-benzotriazole phenol with CH₂ linker and t-butyl groups]

Comparative Example 4

Comparative Example 1 was repeated in the same manner as described except that above Compound 44 (molecular weight: 586.8; melting point: 195° C.; symmetry number: 2) was substituted for Compound 41, thereby obtaining a comparative heat-sensitive adhesive material.

Compound 44

[Structure: phenyl-COONH₄]

Comparative Example 5

Comparative Example 1 was repeated in the same manner as described except that above Compound 45 (molecular weight: 1,119; melting point: 130° C.; symmetry number: 4) was substituted for Compound 41, thereby obtaining a comparative heat-sensitive adhesive material.

Compound 45

[Structure: di-t-butylphenol-linked quinone structure with C₂H₄COOC₄H₈ groups]

Comparative Example 6

Comparative Example 1 was repeated in the same manner as described except that above Compound 46 (molecular weight: 586.8; melting point: 79° C.; symmetry number: 2) was substituted for Compound 41, thereby obtaining a comparative heat-sensitive adhesive material.

Compound 46

[Structure: diphenyl guanidine-like C(=NH) with two NH-phenyl groups]

Comparative Example 7

Comparative Example 1 was repeated in the same manner as described except that above Compound 47 (molecular weight: 318; melting point: 73° C.; symmetry number: 2) was substituted for Compound 41, thereby obtaining a comparative heat-sensitive adhesive material.

Compound 47

[Structure: phthalic acid diphenyl ester, ortho-di(COOC₆H₅)benzene]

Comparative Example 8

Comparative Example 1 was repeated in the same manner as described except that above Compound 48 (molecular weight: 264; melting point: 195° C.; symmetry number: 2) was substituted for Compound 41, thereby obtaining a comparative heat-sensitive adhesive material.

Compound 48

[Structure: 1,3-bis(maleimido)benzene]

Preparation of Thermosensitive Recording Layer Coating Liquid

| (Liquid [H]) | |
|---|---|
| 3-dibutylamino-6-methyl-N-7-anilinofluoran | 1 part |
| 10% Aqueous solution of polyvinyl alcohol | 1 part |
| Water | 2 parts |

A mixture of the above ingredients was pulverized and dispersed using a sand grinder to prepare Liquid [H] containing particles of the leuco dye having an average particle diameter of 1.0 μm.

| (Liquid [I]) | |
|---|---|
| 4-hydroxy-4'-isopropoxydiphenylsulfone | 3 parts |
| 10% Aqueous solution of polyvinyl alcohol | 4 parts |

-continued

| (Liquid [I]) | |
|---|---|
| Silica | 1 part |
| Water | 10 parts |

A mixture of the above ingredients was pulverized and dispersed using a sand grinder to prepare Liquid [I] containing particles of the developer and silica having an average particle diameter of 3.0 μm or less.

(Coating Liquid [J] for Thermosensitive Recording Layer)

4.0 Parts of above Liquid [H], 18.0 parts of above Liquid [I] and 3.0 parts of water were mixed with stirring to obtain Coating Liquid [J].

Preparation of Protecting Layer Coating Liquid

| (Liquid [K]) | |
|---|---|
| Silica | 1 part |
| 10% Aqueous solution of polyvinyl alcohol | 1 part |
| Water | 2 parts |

A mixture of the above ingredients was pulverized and dispersed using a sand grinder to prepare Liquid [K] containing particles of silica having an average particle diameter of 3.0 μm or less.

(Coating Liquid [L] for Protecting Layer)

4.0 Parts of Liquid [K], 10.0 parts of 10% aqueous solution of polyvinyl alcohol, 1.0 part of 30% dispersion of zinc stearate (Z-730 manufactured by Chukyo Yushi Co., Ltd.), 3.2 parts of 12.5% epichlrohydrin solution of polyamide and 5.8 parts of water were mixed with stirring to obtain Coating Liquid [L] for forming a protecting layer.

Preparation of Heat-sensitive Recording Material

A heat-sensitive recording layer and a protecting layer were successively formed on an opposite side of the paper substrate from the adhesive layer of each of the heat-sensitive adhesive materials obtained in the above Examples 1 to 11 and Comparative Examples 1 to 8. Thus, Coating Liquid [J] prepared as above was applied to the opposite side of the support in a deposition amount so that the amount of the leuco dye was 0.5 g/m² to form a heat-sensitive recording layer. After drying, Coating Liquid [L] was applied to the heat-sensitive recording layer and dried to form a protecting layer having a deposition amount of 3.5 g/m². The resulting laminate was subjected to a calendar treatment so that the surface of the protecting layer had a surface smoothness of 2,000 second as measured using an Oken-type smoothness measuring device.

The thus obtained heat-sensitive recording materials having the heat-sensitive adhesive materials obtained in Examples 1 to 11 and Comparative Examples 1–4 were subjected to an adhesion test and anti-blocking test according to the following procedures.

Adhesion Test

A heat-sensitive recording material is cut to obtain a sample having a size of 40 mm×90 mm. The sample is thermally printed and activated with two thermal heads of a heat sensitive printer under the following conditions:

| Printing conditions | |
|---|---|
| thermal head: | 0.54 mJ/dot |
| print speed: | 4 ms/line |
| platen pressure: | 6 kgf/line |

| Activating conditions | |
|---|---|
| thermal head: | 0.45 mJ/dot |
| activation speed: | 4 ms/line |
| platen pressure: | 6 kgf/line |

The thermally activated sample is applied, while pressing at a pressure of 2 kg using a rubber roller, to a polyolefin wrapping film (PO film) and a polyvinyl chloride wrapping film (PVC film) with the longitudinal axis of the sample being in parallel with the process direction of the film. After allowed to stand for 1 minute, the sample is peeled at a peel speed of 300 mm/min with a peel angle of 180° C. The adhesion strength is expressed in terms of a force (unit: gf/40 mm) required for peeling. The above procedure is carried out in an ordinary condition (at 20° C. under a relative humidity of 30%). Further, the above procedure is repeated in a cold environment (at 0° C. under relative humidity of 10%) and in a hot environment (at 40° C. and under relative humidity of 30%). The test results are summarized in Table 1.

Anti-blocking Test

Two same heat-sensitive recording material samples are superposed such that the heat-sensitive adhesive layer of one sample faces the protective layer of the other sample. The superposed samples are then maintained in pressure contact with each other at 40° C., 50° C. and 60° C. under a pressure of 2 kg/cm² for 24 hours in a dry atmosphere. After being allowed to cool to room temperature, the two samples are separated from each other. During separation, sound, resistance to separation, transfer of components from one sample to the other, and delamination of samples are checked and scored according to the standard shown in Table 2. An average score represents the anti-blocking property. The results are summarized in Table 3.

TABLE 1

(Adhesion Strength in [gf/40 mm])

| | 0° C./10% RH | | 20° C./30% RH | | 40° C./30% RH | |
|---|---|---|---|---|---|---|
| Example No. | PO film | PVC film | PO film | PVC film | PO film | PVC film |
| 1 | 134 | 248 | 1231 | 1354 | 452 | 489 |
| 2 | 854 | 983 | 1244 | 1431 | 464 | 483 |
| 3 | 1162 | 1329 | 1259 | 1441 | 472 | 511 |
| 4 | 1241 | 1589 | 1309 | 1681 | 513 | 681 |
| 5 | 1332 | 1544 | 1341 | 1589 | 537 | 667 |
| 6 | 1572 | 1663 | 1349 | 1678 | 586 | 658 |
| 7 | 992 | 1128 | 1246 | 1551 | 454 | 441 |
| 8 | 1889 | 2011 | 1412 | 1689 | 577 | 952 |
| 9 | 1281 | 1345 | 1338 | 1618 | 511 | 553 |
| 10 | 2211 | 2413 | 1558 | 1718 | 622 | 781 |
| 11 | 2211 | 2413 | 1558 | 1718 | 622 | 781 |
| Comp. 1 | 0 | 0 | 1132 | 1091 | 92 | 121 |
| Comp. 2 | 0 | 0 | 0 | 0 | 0 | 0 |
| Comp. 3 | 0 | 0 | 70 | 58 | 1131 | 881 |
| Comp. 4 | 0 | 0 | 0 | 0 | 0 | 0 |

TABLE 1-continued (Adhesion Strength in [gf/40 mm])

| Example No. | 0° C./10% RH | | 20° C./30% RH | | 40° C./30% RH | |
|---|---|---|---|---|---|---|
| | PO film | PVC film | PO film | PVC film | PO film | PVC film |
| Comp. 5 | 0 | 0 | 17 | 21 | 697 | 561 |
| Comp. 6 | 0 | 0 | 1448 | 1388 | 444 | 431 |
| Comp. 7 | 0 | 0 | 685 | 676 | 211 | 188 |
| Comp. 8 | 0 | 0 | 0 | 0 | 428 | 411 |

TABLE 2

(Evaluation rating)

| Score | Resistance to separation | Peel sound | Transfer in spots | Delamination |
|---|---|---|---|---|
| 10 | none | none | none | none |
| 9 | slight | | | |
| 8 | significant | slight | | |
| 7 | | significant | | |
| 6 | | | slight | |
| 5 | | | 30 to 50% | |
| 4 | | | over 50% | |
| 3 | | | | slight |
| 2 | | | | 30 to 50% |
| 1 | | | | over 50% |

TABLE 3

(Anti-Blocking (average score))

| Example No. | 40° C. | 50° C. | 60° C. |
|---|---|---|---|
| 1 | 7 | 7 | 7 |
| 2 | 8 | 8 | 7 |
| 3 | 8 | 8 | 7 |
| 4 | 8 | 8 | 7 |
| 5 | 8 | 8 | 7 |
| 6 | 8 | 8 | 8 |
| 7 | 8 | 8 | 7 |
| 8 | 9 | 9 | 8 |
| 9 | 8 | 8 | 7 |
| 10 | 9 | 9 | 8 |
| 11 | 10 | 10 | 9 |
| Comp. 1 | 3 | 2 | 1 |
| Comp. 2 | 3 | 2 | 1 |
| Comp. 3 | 7 | 7 | 5 |
| Comp. 4 | 8 | 6 | 5 |
| Comp. 5 | 7 | 7 | 6 |
| Comp. 6 | 6 | 1 | 1 |
| Comp. 7 | 2 | 1 | 1 |
| Comp. 8 | 7 | 7 | 4 |

From the results shown in Tables 1 and 3, it is seen that the heat-sensitive adhesive materials of Examples 1 to 11 exhibit high adhesiveness (both polyolefin and polyvinyl chloride films) in both low and high temperature conditions and good anti-blocking property (average score is 7 or more).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2002-003992, filed Jan. 11, 2002, inclusive of the specification and claims, are hereby incorporated by reference herein.

What is claimed is:

1. A heat-sensitive adhesive material comprising a substrate and a heat-sensitive adhesive layer provided thereon and comprising a thermoplastic resin, and a solid plasticizer having a molecular weight of 250 to 550 and a melting point of 95 to 160° C.

2. A heat-sensitive adhesive material as claimed in claim 1, wherein said solid plasticizer is selected from compounds having an asymmetrical molecular structure.

3. A heat-sensitive adhesive material as claimed in claim 1, wherein said solid plasticizer is selected from compounds having a benzoate group.

4. A heat-sensitive adhesive material as claimed in claim 1, wherein said solid plasticizer is selected from compounds having a benzophenone group.

5. A heat-sensitive adhesive material as claimed in claim 1, wherein said solid plasticizer is selected from compounds having a phenylenediamine group.

6. A heat-sensitive adhesive material as claimed in claim 1, wherein said solid plasticizer is selected from compounds having a benzothiazole group.

7. A heat-sensitive adhesive material as claimed in claim 1, wherein said heat-sensitive adhesive layer additionally includes at least one additive selected from the group consisting of a tackifier, a supercooling improving agent, an anti-blocking agent and a water-soluble binder.

8. A heat-sensitive adhesive material as claimed in claim 1, further comprising a heat-sensitive recording layer provided on opposite side of said substrate from said heat-sensitive adhesive layer.

9. A heat-sensitive adhesive material as claimed in claim 8, further comprising a heat insulating layer provided between said heat-sensitive adhesive layer and said substrate.

10. A heat-sensitive adhesive material as claimed in claim 8, wherein said heat-sensitive recording layer has printing of an ink thereon.

11. A heat-sensitive adhesive material as claimed in claim 8, and cut into a plurality of labels.

12. A heat-sensitive adhesive material as claimed in claim 8, and in the form of a roll which has been transversely cut, with less than complete severing, into a plurality of labels.

* * * * *

UNITED STATES PATENT AND TRADEMARK OFFICE
CERTIFICATE OF CORRECTION

PATENT NO. : 6,696,150 B2
DATED : February 24, 2004
INVENTOR(S) : Toshiaki Ikeda and Tomoyuki Kugo It is certified that error appears in the above-identified patent and that said Letters Patent is hereby corrected as shown below:

<u>Title page,</u>
Insert Item:
-- [73] Assignee: Ricoh Company, Ltd., Tokyo (JP). --.

Signed and Sealed this

Seventh Day of February, 2006

JON W. DUDAS
*Director of the United States Patent and Trademark Office*